Patented Jan. 11, 1927.

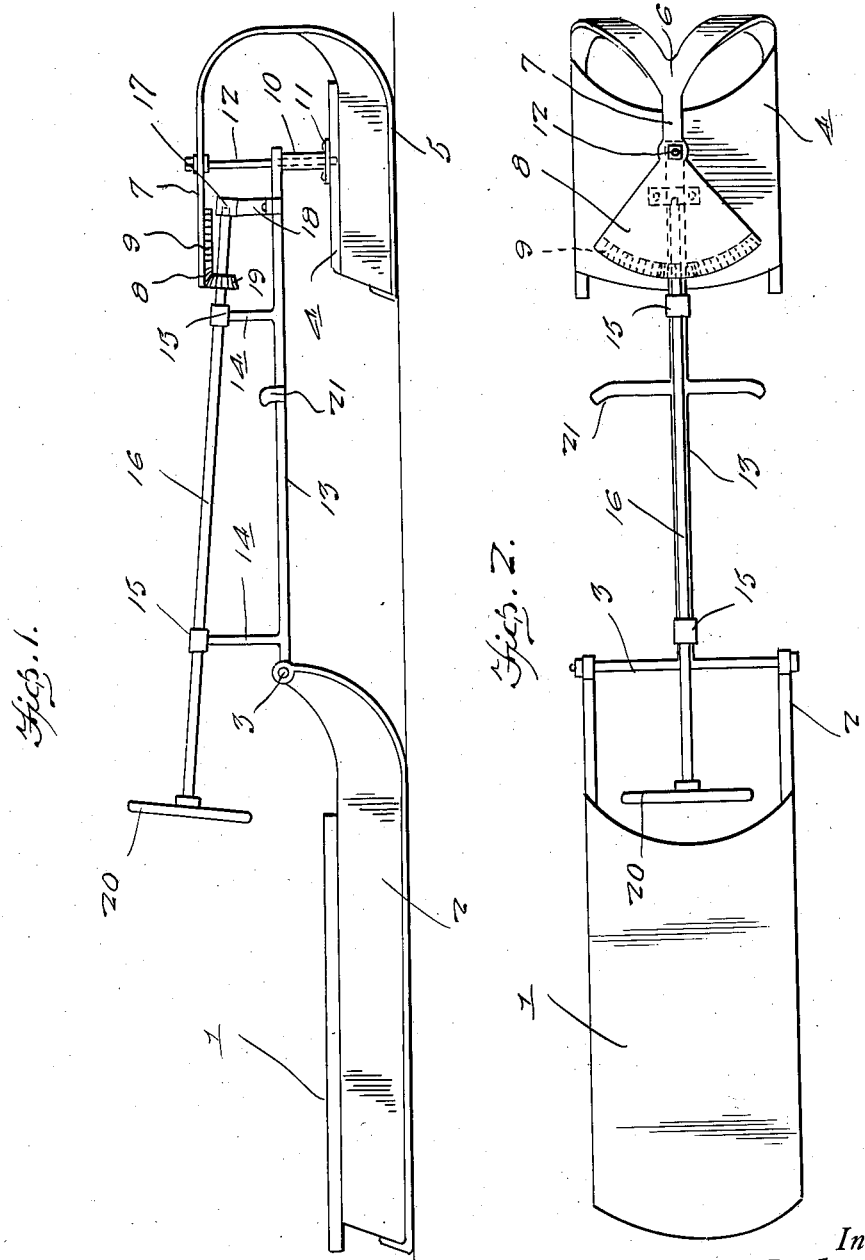

1,613,722

UNITED STATES PATENT OFFICE.

JUNIUES CLAY ROBINSON, OF CINCINNATI, OHIO.

SLED.

Application filed June 9, 1926. Serial No. 114,727.

The present invention relates to improvements in sleds and has reference more particularly to one which is provided with a steering sled, the same being operated from a point remote thereof by the occupant of the main sled.

Another important object of the invention is to provide a sled which is pivotally connected to the steering sled in order to facilitate the vertical movement of the sled.

A further object of the invention is to provide a sled of the above mentioned character which is simple in construction, inexpensive, strong and durable, and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the several views:

Figure 1 is a side elevation of the sled embodying my invention, and

Figure 2 is a top plan view thereof.

In the drawing wherein for the purpose of illustration is shown the preferred embodiment of my invention, the numeral 1 designates the main sled, the same including the parallel spaced side runners 2, the forward ends of which are disposed upwardly and extending beyond the forward ends of the runners is the cross rod 3 the purpose of which will be hereinafter more fully described.

Adapted for cooperation with the main sled 1 is the steering sled designated generally by the numeral 4, the same being arranged forwardly of the main sled. The runners 5 of the steering sled 4 have their intermediate portions curved upwardly and gradually converging as illustrated at 6 and merge into the rearwardly extending arm 7 which arm is disposed above the steering sled 4 in the manner as clearly shown in Figure 1. The free end portion of the arm terminates in the fan shaped portion 8 and arranged on the under side of this fan shaped portion is the segmental gear 9 the purpose of which will also be hereinafter more fully described.

A relatively short tubular member 10 has its lower end flanged as illustrated at 11, and secured on the top of the steering sled 4 in the manner clearly illustrated in Figure 1. A vertical shaft 12 which is secured at its upper end to the arm 7 extends downwardly through the tubular member 10 and provides a means whereby the sled 4 may be moved in a horizontal plane for guiding or steering the main sled 1.

Extending forwardly from the intermediate portion of the cross rod 3 is the elongated bar 13, the forward end thereof being provided with an aperture through which extends the vertical shaft 12 and normally the forward end of the bar 13 rests on the upper end of the relatively short tubular sleeve 10. As the respective ends of the cross rod 3 are journaled in the upper forward ends of the side runners 2 of the main sled 1, the main sled 1 will be adapted for vertical movement when the sled is traveling over an uneven snow or ice covered surface.

A pair of vertical shaft supporting arms 14 extend upwardly from the bar 13 at points adjacent the respective ends thereof and as shown in Figure 1, the rear arm 14 is longer than the forward arm and arranged upon the upper end of each of these arms is a suitable bearing sleeve 15. A shaft 16 extends through the aligning bearing sleeve 15 on the upper ends of the arms 14 and the forward end of this shaft is journaled in a suitable bearing 17 associated with the upper end of the vertical bracket 18 which is secured on the forward end portion of the bar 13 at a point forwardly of the foremost arm 14. This construction is clearly shown in Figure 1.

A bevel gear 19 is secured on the forward portion of the shaft 16 and is adapted for engagement with the segmental gear 9 whereby the steering sled 4 may be rotated about the vertical shaft 12. A hand steering wheel 20 is arranged on the rear end of the shaft 16 and is disposed in such a position as to permit the occupant of the main sled 1 to easily actuate the same. Suitable foot rests 21 extend laterally from the intermediate portion of the bar 13 so that the occupant of the main sled may be seated comfortably thereon and also permit the steering mechanism to be easily and efficiently operated.

It will thus be seen from the foregoing description that I have provided a sled construction which will permit the occupant of the same to easily steer the sled and furthermore by arranging the steering sled in the manner as shown and above described, the same will compensate for any uneven surfaces which are encountered during the traveling of the sled over the snow or ice covered roads.

The simplicity in which my device is constructed enables the parts to be readily and easily assembled and operated.

While I have shown the preferred embodiment of my invention, it is to be understood that minor changes in the size, shape, and arrangement of parts may be resorted to without departing from the spirit of the invention, and the scope of the appended claims.

Having thus described the invention, what I claim as new and desire to secure by Letters Patent is:—

1. In a device of the class described, a main sled, a front steering sled, a cross rod extending through the forward ends of the runners of the main sled, the main sled being adapted for vertical movement with respect to the cross rod, a connection between the cross rod and the front steering sled, and means for steering the front sled from the main sled.

2. In a device of the class described, a main sled, a front steering sled, the runners of the steering sled being curved upwardly and gradually converging, and merging into a rearwardly extending arm which is disposed above the steering sled, a vertical shaft extending through said arm and into the top of the steering sled, a connection between said shaft and the main sled to permit the vertical movement of the main sled, said connection comprising an elongated bar having an aperture in its forward end through which said shaft extends, a cross rod associated with the opposite end of said bar and having its ends extending through the forward ends of the runners of the main sled, a shaft extending longitudinally of said bar and adapted for rotation thereon, intermeshing gearing associated with the forward end of said shaft and the free end portion of said rearwardly disposed arm, and a steering wheel carried by the rear end of the shaft to facilitate the steering of the front sled from the main sled.

3. In a device of the class described, a main sled, a steering sled arranged forwardly thereof, a horizontally disposed arm carried by the steering sled and arranged above the top thereof, a vertical shaft extending through said arm and the top of the steering sled, a tubular guide sleeve for the lower portion of the vertical shaft secured on the top of the steering sled, a connection between the main sled and the steering sled comprising an elongated bar, the same having an aperture in its forward end portion through which said shaft extends, the forward end of said bar resting on the upper end of said guide sleeve, a cross rod carried by the rear end of said bar and having its ends extending through the forward ends of the respective runners of the main sleds to afford a pivotal connection for the main sled, arms extending vertically from said bar, bearings associated with the upper ends of said arms, a shaft journaled for rotation through said bearings, a segmental gear arranged on the under side of the free end portion of said horizontally disposed arm, a pinion carried by the forward portion of said shaft and meshing with said segmental gear, and a steering wheel on the opposite end of the shaft to facilitate the steering of the front sled from the main sled.

In testimony whereof I affix my signature.

JUNIUES CLAY ROBINSON.